United States Patent [19]

Bromley et al.

[11] Patent Number: 4,593,173

[45] Date of Patent: Jun. 3, 1986

[54] ELECTRONIC APPARATUS FOR AUTOMATIC CONTROL OF THE PLACING OF MATERIAL AT A JUNCTION BETWEEN SURFACES

[75] Inventors: Jonathan S. E. Bromley, Oxford; William F. Clocksin, Cambridge; Peter G. Davey; Colin G. Morgan, both of Oxford; Albert R. Vidler, Oxon, all of England

[73] Assignee: National Research Development Corp., London, England

[21] Appl. No.: 547,599

[22] Filed: Nov. 1, 1983

[30] Foreign Application Priority Data

Nov. 8, 1982 [GB] United Kingdom ............... 8231772

[51] Int. Cl.$^4$ .............................................. B23K 9/12
[52] U.S. Cl. .............................. 219/124.34; 318/577
[58] Field of Search .................... 219/124.34; 318/577; 358/903; 356/376, 377, 387; 901/41, 42, 47, 9

[56] References Cited

U.S. PATENT DOCUMENTS 4,380,696  4/1983  Masaki ........................... 219/124.34

OTHER PUBLICATIONS

E. C. Hildreth, "Edge Detection in Man & Machine", *Robotics Age*, 9/1981.
L. B. Jackson et al, "An Approach to the Implementation of Digital Filters", IEEE Trans. Audio Electroacoust., 9/1968.

*Primary Examiner*—Clifford C. Shaw
*Attorney, Agent, or Firm*—Cushman, Darby & Cushman

[57] ABSTRACT

Apparatus to control the automatic placing of material along a junction between surfaces with reference to the form and position of the junction including means controllably movable to deposit material progressively along the junction in response to a control signal, means linked to the movement of the means to deposit material to produce an image of the surfaces and junction, filter means to remove from the image information resulting from illumination at other than a specific wavelength with a tapped delay line to provide a specific impulse response, means to extract from the image that portion unambiguously defining the junction form and position, means responsive to said image portion to derive said control signal to control the means to deposit material to move in a required manner along said junction to deposit material.

4 Claims, 5 Drawing Figures

ELECTRONIC APPARATUS FOR AUTOMATIC CONTROL OF THE PLACING OF MATERIAL AT A JUNCTION BETWEEN SURFACES

This invention relates to the automatic control of the placing of material at a junction between surfaces and more particularly to the placing of a weld to join the surfaces.

The material may be a weld to be formed at the junction of the surface. The material may be an adhesive or sealant to be placed at the junction of the surfaces. The automatic control is to respond to the position and form of the junction to the material correctly. One use of the invention is the automatic arc welding together of sheet metal pressings.

Automatic control of the placing of material such as a weld bead with reference to the form and position of a junction between surfaces is a difficult procedure when the surfaces are other than perfectly regular and predictable. A skilled human welder makes many rapid changes in torch position, speed etc. while making a weld to take account of variations in the separation between surfaces at the junction, distortions in the surfaces etc. The human welder bases these changes on many pieces of information which are assessed rapidly enough to be used to control the torch as it moves along the weld. An automatic process to reproduce these rapid changes must have a very large information processing capacity to imitate the human. To operate such a large processing capacity quickly enough to make appropriate real-time changes in weld conditions is expensive and has hitherto prevented the introduction of automatic welding techniques that are fully competitive with the human welder.

In a paper published in March 1982 various methods of arc-welding metal pressings were assessed. (Clocksin, Barratt, Davey, Morgan and Vidler, Visually guided arc-welding of thin sheet steel pressings. Proc. Int. Symp. Industrial Robots, 12, Paris). The desirability of achieving a weld in one pass over each production item is clear but raises many problems of control because of seam variation and the harsh welding environment. A general form for an apparatus to achieve such one-pass welding, following a teaching passover a master workpiece, is set out in the above paper and a form of sensor to measure the three-dimensional geometry of the workpiece surface is outlined as having an infra-red GaAlAs laser with a cylindrical lens to cast a sheet of light on a workpiece. A solid state camera views the stripe of light on the workpiece at the intersection with the light sheet. A filter on the camera reduces the effect of visible arc emission. The camera is not severely affected by electromagnetic emission even when 3 cm from the arc and a metal shield protects the arrangement from molten metal. The camera shield is directed to a cleaning station when it is necessary to remove weld spatter. However the apparatus, is too slow for effective use, although reasonably accurate, when faced with a production workpiece which is significantly different from the master workpiece.

In a co-pending Application entitled Automatic Welding (inventors Clocksin, Davey, Morgan and Vidler) assigned to the same assignees as this Application and filed under our U.S. Ser. No. 547,600 filed 11/1/83 and incorporated herein by reference an apparatus is described which includes means to derive a control signal from information about the illumination being received by pick-up means and subject to filtering to reduce interference from the welding action. In particular the illumination of the area to be welded is effectively filtered at source by being a monochromatic device such as a semiconductor laser, filtered on pick-up by a narrow-band optical filter, e.g. having a spectral half width of some 10 nm at the chosen laser emission of 830 nm. In this way rejection of unwanted light is significantly improved.

However further improvement can be achieved in the processing of a signal derived from the picked-up illumination.

It is an object of the present invention to provide a control arrangement for an automatic welding apparatus with performance improved by processing of a signal derived from illumination of the area to be welded.

In particular automatic arc welding is envisaged.

According to the invention there is provided apparatus to control the automatic placing of material along a junction between surfaces with reference to the form and position of the junction including means controllably movable to deposit material progressively along the junction in response to a control signal, means linked to the movement of the means to deposit material to produce an image of the surfaces and junction, filter means to remove from the image information resulting from illumination at other than a specific wavelength with a tapped delay line to provide a specific impulse response, means to extract from the image that portion unambiguously defining the junction form and position, means responsive to said image portion to derive said control signal to control the means to deposit material to move in a required manner along said junction to deposit material.

Conveniently the output of the delay line taps is fed to a sample-and-hold circuit clocked in synchronism with a counter so that the occurrence of a significant output from the filter can be identified with a particular point of a scan of the illumination of the area.

Advantageously the sample-and-hold circuit is fast enough to determine said position for each line in a line-by-line scan of the area within the time taken for said line-by-line scan, that is in real-time.

According to the invention there is also provided a method of controlling an automatic arc welding process at a junction of surfaces including producing an image of a welding area containing the junction and illuminated by a light sheet, filtering the image with a tapped delay line to provide a specific impulse response to remove from the image information resulting from illumination at other than a specific wavelength, extracting from the filtered image that portion representing the form and position of the junction and deriving from said image portion control information to, control the welding process to operate along said junction.

Embodiments of the invention will now be described with reference to the accompanying drawings in which.

Figure 2:
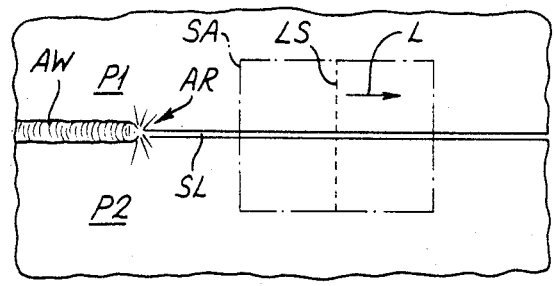
FIGS. 2 and 3 are representations of a welding area and picked-up illumination information, helpful in understanding the action of the invention.

Referring first to FIG. 2 this shows diagrammatically a welding area. Two metal parts, P1, P2, are to be welded together along a seam line SL by a fillet of arc welding AW applied by an arc AR from a welding head not shown. The welding head is to be controlled to follow the seam line SL. The metal parts are commonly sheet metal pressings for vehicles, e.g. an axle case.

The seam line position is indicated by shining a stripe of light LS to cross the seam line and scanning the area SA with a television pick-up device to produce an image by scanning in lines along the direction of arrow L. A suitable arrangement is described in the above co-pending Application incorporated herein by reference.

Figure 3:
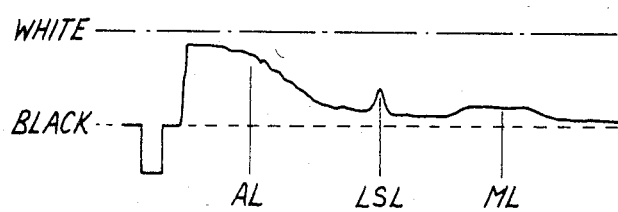

FIG. 3 shows a typical line of the video signal from the scan, in the same sense as arrow L. Immediately after the left hand synchronising pulse there is an area of high illumination AL from the arc AR. Towards the right hand synchronising pulse there is an area of lower illumination ML produced by metal sputter. In between is the signal LSL caused by the light stripe LS. To determine the position of the seam and control the welding head it is necessary to relate the occurrence of LSL in the video signal with the point in time represented by the time based video signal and thereby the position on the parts P1, P2.

Because of the other illumination picked up the position of signal LSL is not always well defined. The video information can be produced as discrete pixels along each line, typically 256 pixels on each of 256 lines and the aim is to relate the occurrence of LSL as closely as possible to a specific pixel in each line. Because of the shape of parts P1, P2 the position of LSL will vary from line to line.

Figure 1:
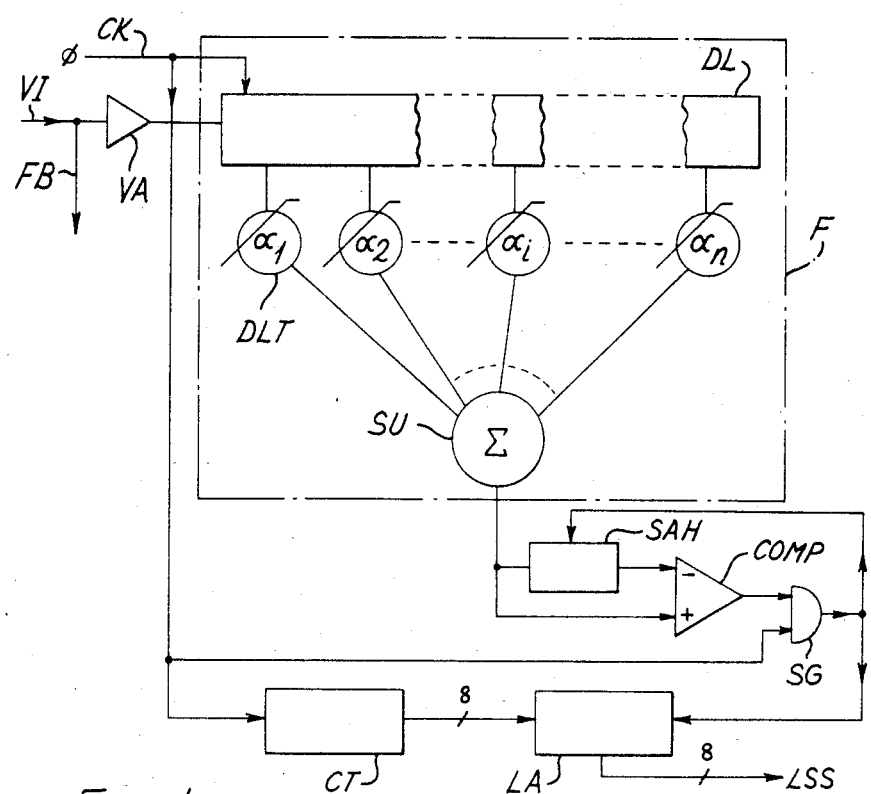
FIG. 1 is a block schematic circuit of a control arrangement embodying the invention.

Referring to FIG. 1 this shows in block schematic form a circuit to filter time-based video information to isolate a particular component of the information and correlate the occurrence of this component with the video time base.

In the arrangement shown in the Figure video information is supplied at input VI. The video information is conveniently in the form of 256 lines each of 256 pixels. The video information is also applied to a frame buffer store via connection FB.

The video information is supplied serially pixel-by-pixel and line-by-line to filter F in real time.

Filter F includes a delay-line DL. Delay-line DL in this embodiment is a 32-tap delay line of the bucket brigade type. Specifically the delay line described in Application Note 105 by E.G. & G. Reticon Ltd., California, USA, "A tapped analog delay for sampled data signal processing" is used. The various taps are indicated generally as DLT each tap having a selected coefficient indicated as $\alpha_1, \alpha_2,--\alpha_i--\alpha_n$, where n is the total number of taps. The outputs from the taps are summed together in element SU to produce an output indicating the occurrence of the required component.

This output is applied to a sample-and-hold circuit SAH. The operation of the delay-line-based filter F and the sample-and-hold circuit SAH are controlled by a clock signal CK. In the present embodiment this clock signal is at 5.5 MHz. For each clock pulse an amplitude value for the particular component of the video signal is provided at the output of the sample-and-hold circuit and this appears as an 8-level signal LSS at the output of a counter latch LA driven by counter CT. The position of the stripe LS, in terms of signal LSL in a video line, is thus produced in turn for each video line as time-based signal LSS.

From the practical point of view the clock signal can break through the filter as narrow spikes at twice clock frequency. These can be removed with a straightforward second or third order low pass filter on the output of summing device SU. The bandwidth of the output at SU has already been otherwise restricted to prevent the low pass filter causing any other problem. Also the load impedance applied to each tap must be low enough to reduce crosstalk between taps. For a tap output impedance of about 3 Kohm a load impedance of 1 Kohm or less is preferred. Final adjustment can be made by adjusting the tap coefficients. The clock rate is such that there is negligible signal degradation in the delay line.

Figure 4:
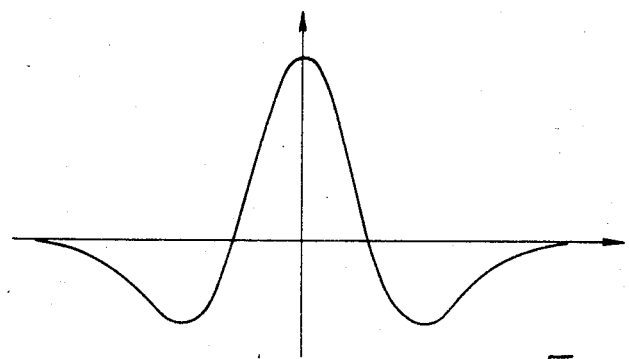
FIG. 4 shows a response of a filter used in an embodiment of the invention.
Figure 5:
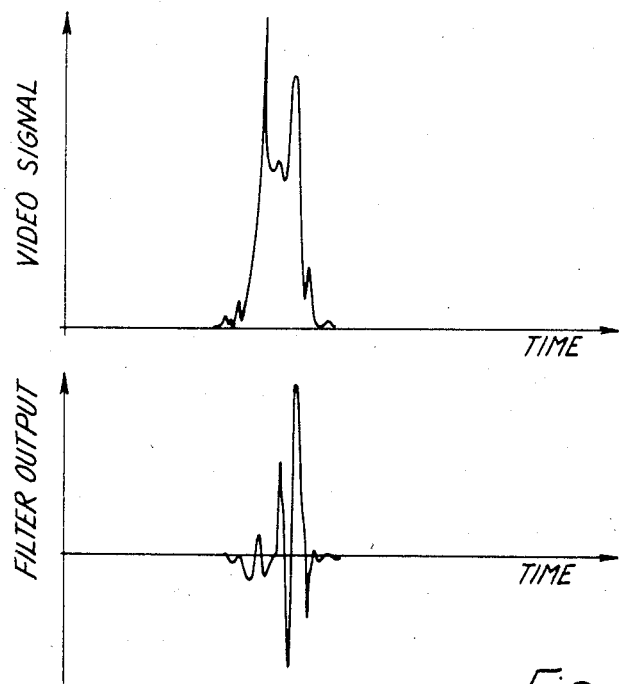
FIG. 5 shows the action of such a filter.

The effect of the filter provided by the tapped delay line is indicated in FIGS. 4 and 5. FIG. 4 shows a typical impulse response for the filter. The filter is of the "DOG" type, i.e. difference-of-Gaussians, and can be produced by either software or hardware techniques. However the software technique is not fast enough to give an accurate answer in real time, at least without restricting the performance of the filter and thereby giving rise to an unsatisfactory spatial frequency response and degraded signal-to-noise rato.

An important feature of the filter response used is that it has only one large positive peak of impulse response. If a conventional very narrow-band filter is used to provide the required discrimination there will be several peaks in the response. This could lead to more than one position along a video line being indicated for the stripe signal LSL with obvious problems. Another feature is that the time integral of the filter can be arranged to be zero and thus there is no response to slow changes in the signal.

The transversal filter having a finite impulse response, of which the illustrated filter is an example, is especially suitable as its impulse response is readily adjusted. The impulse response corresponds with the coefficients of the tap $\alpha_l$ to $\alpha_n$ of the delay line DL. The mapping from spatial frequency (in the horizontal direction on the work piece) to temporal frequency (in the electrical video signal) is accomplished by the line scan of the pick-up device.

The arrangement described will thus process a video signal of a line-by-line scan across area SA to determine for each line the position along the line of stripe LS and provide this position as a pixel number along the line without any ambiguity such as two pixel numbers spaced apart on the line.

The arrangement has considerable resistance to interference despite the difficult nature of the signal to be processed. Considering the 256 pixel line again the stripe LS produced a signal LSL which can cover about 6 pixels of the line. (The brightness profile of the stripe LS on the workpiece is about 300 micrometers wide at half-height of its approximately Gaussian distribution.) Noise will prevent very narrow-band filters being effective because of the wide spatial-frequency bandwidth. Noise does appear to be present in most of the spectrum of the stripe signal. However the lower, especially very low, spatial frequencies can contain a great deal of unwanted information so these must be filtered out.

FIG. 5 shows the action of the exemplary arrangement on a typical video line waveform. The upper curve is the line waveform before filtering, the lower curve that after filtering with the stripe signal distinguised from the other signals and background noise.

The arrangement described thus provides in real time information about the position of the stripe LS in area SH in terms of the pixel number of the signal LSL for each line of the scan over area SA. The provision of this information in real time, called a "hit-list", permits the control-loop for an automatically controlled seam tracking welding head to be closed especially when welding difficult parts such as sheet metal pressings which are likely to vary in their exact shape and fit. The gain in the speed of response by using the filter is not lost by greater complexity in subsequent calculations on the stripe geometry as these do not occupy a large amount of computation time.

Although the embodiments have been described in relation to welding the techniques can be applied to other seam or edge following procedures for example to control the deposit of glue or sealant in relation to a particular feature of an article even when the form of the feature varies from a specified shape, say because of practical manufacturing tolerances.

We claim:

1. Apparatus to control the automatic placing of material along a junction between surfaces with reference to the form and position of the junction comprising:

means to deposit material controllably movable progressively along the junction in response to a control signal, means to illuminate said junction in light of a specific wavelength, means for producing an image of the surfaces where material is next to be placed, said image producing means including information collection means linked to the means to deposit material to move with said means to deposit material to collect information to produce said image during controlled material placing movement along the junction, said image producing means further including means for removing from the collected image information interfering information resulting from illumination other than by said light source of specific wavelength, said removing means comprising a spatial frequency filter means including a tapped delay line to provide a specific impulse response to respond to information in the image from said light source representing the junction position together with means to extract from the response of the spatial frequency filter that portion of the image unambiguously defining the junction form and position, and means responsive to said image portion to derive said control signal during progressive material placing movement free of the need to handle said interfering information.

2. Apparatus according to claim 1 in which the image is a time-based array of pixel elements.

3. Apparatus according to claim 1 including a sample-and-hold circuit connected to receive outputs from taps of the tapped delay line, a counter to count pixel elements, means to clock the sample-and-hold circuit and counter in synchronism to identify a significant output from the filter with a particular pixel position.

4. Apparatus according to claim 1 in which the speed of the sample-and-hold circuit is related to the time-based scan rate of the image to determine said pixel positions for an image within the time for the scan of the image.

* * * * *